Figure 1:
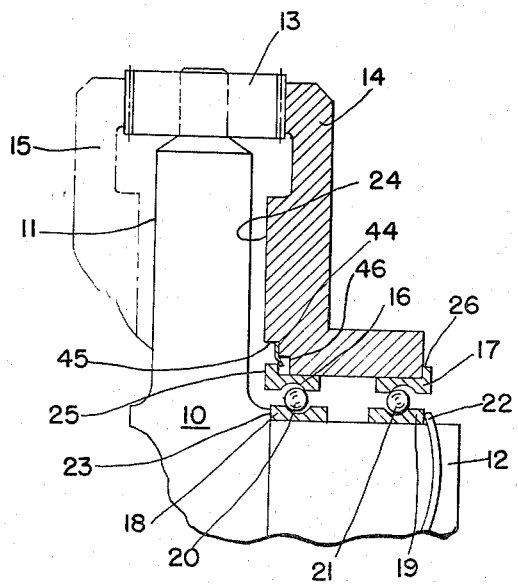

Dec. 6, 1960

A. C. HIRSCHLE 2,962,912

MEANS FOR MINIMIZING BACKLASH

Filed Oct. 2, 1958

INVENTOR.
ALFRED C. HIRSCHLE
BY S. J. Rotondi,
A. J. Dupont & H. R. Johns
ATTORNEYS.

United States Patent Office 2,962,912
Patented Dec. 6, 1960

2,962,912

MEANS FOR MINIMIZING BACKLASH

Alfred C. Hirschle, Wayne, Pa., assignor to the United States of America as represented by the Secretary of the Army Filed Oct. 2, 1958, Ser. No. 765,005

3 Claims. (Cl. 74—409)

(Granted under Title 35, U.S. Code (1952), sec. 266)

The invention described herein may be manufactured and used by or for the Government for governmental purposes without the payment to me of any royalty thereon.

This invention relates to an arrangement of bearings and to a method of assembly whereby backlash between gears is minimized by controlling the axial play in the ball bearings. While the invention is herein illustrated as applied to a differential mechanism wherein a face gear is arranged to mesh with a spur gear, it is applicable to other types of mechanisms which involve similar gear arrangements.

In the manufacture of gears for use in precision instruments it is difficult and expensive to limit tolerances sufficiently to reduce backlash to the required minimum. According to the present invention, this difficulty is avoided by offsetting the inner race of the positioning bearing in a fixed relationship to the pitch diameter of the face gear. Also, a fixture is provided for assembling the positioning bearing in this offset relation.

The invention will be better understood from the following description when considered in connection with the accompanying drawings and its scope is indicated by the appended claims.

Figure 2:
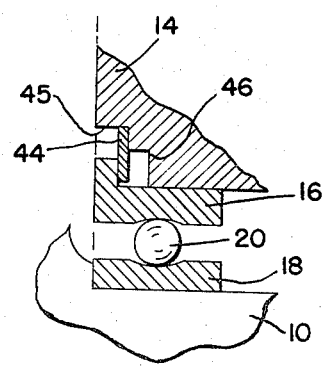
Figure 3:
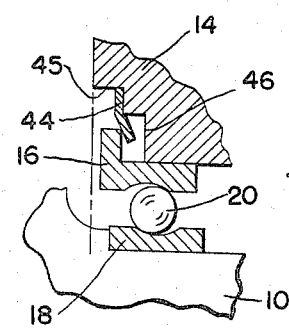
Figure 4:
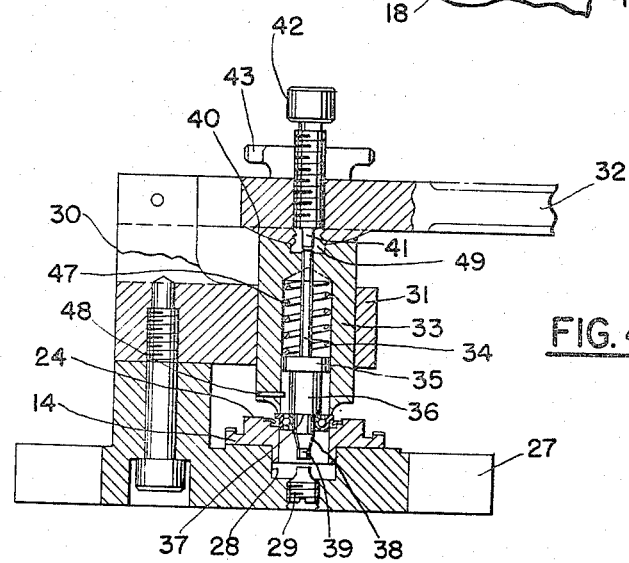

Referring to the drawings:

Fig. 1 illustrates a partial section of a face gear type differential mechanism constructed in accordance with the invention, Figs. 2 and 3 illustrate certain steps in the manufacture of the mechanism, and Fig. 4 illustrates a fixture which is used in assembling the mechanism of Fig. 1.

In order to simplify the drawings, their showing is restricted to such parts of the differential mechanism as are required for an understanding of the invention. It will be apparent to those skilled in the art that the member 10 (see Fig. 1) has four spindles 11, 12 and two not shown, displaced from one another by ninety degrees, and that the oppositely extending spindles are similar to those shown. Thus the spindle opposite to the spindle 12 bears a face gear 15 similar to the face gear 14 born by the spindle 12, and the spindle opposite to the spindle 11 bears a spur gear which is similar to and meshes with the face gears 14 and 15 in the same manner as the gear 13.

It can be seen that the bearings of the face gear 14 includes a pair of outer races 16 and 17, a pair of inner races 18 and 19 and sets of balls 20 and 21, the inner race 19 being held in its illustrated position by a retaining spring 22. The inner race 18 abuts a surface 23 which is in a plane somewhat to the right of the surface 24 of the gear 14. The surface 25 of the outer race 16 is in a plane intermediate the planes of the surfaces 23 and 24. The outer race 17 is held by a flange 26 in a position such that it is displaced to the right with respect to the race 19.

This arrangement of the bearing results in a sort of wedging action which prevents axial movement of the gear 14 and maintains the pitch diameter of the gear 14 in constant rolling contact with that of the gear 13.

The illustrated disposition of the various parts of the bearing may be established by various means one of which is depicted by Fig. 4. This is a fixture including a bed 27 having a recess 28 adapted to receive the hub of the gear 14 and an adjustable stop plug 29. Bolted to the bed 27 is an upright 30 which has an arm 31 and is hinged to a lever 32 at its upper end. Movable through an opening near the end of the arm 31 is a collar 33 which encloses a plunger 34 loaded by a spring 47. The plunger 34 is formed to provide a guide 35, a stud 36, a shoulder 37, a sloping surface 38 and an extension 39 arranged to engage the stop 29. A pin 48 is arranged to retain the plunger 34.

Associated with the lever 32 is a bearing surface 40 arranged to engage a similar surface at the upper end of the collar 33, and threaded into the lever 32 is a pin 41 which is adjusted to engage the upper end of the plunger 34. The pin 41 is adjustable by means of a knob 42 and is locked in place by a lock nut 43.

In assembling the bearing 16—18 in the gear 14, the gear is placed on the base 27 as illustrated in Fig. 4, a ring 44 is alined with a recess 45 in the gear and the bearing 16—18 is started into the center bore of the bearing. The stud 36 is then engaged with the race 18 so that the pressure of spring 47 preloads the race 18 forcing all axial play of the bearing downward. This leaves a gap between the parts 14 and 34. The pin 41 is now screwed down until it bottoms on the upper end of plunger 34 as observed through a sighting slot 49, the collar 33 is placed against the race 16 and the lever 32 is operated to apply pressure to the stud and collar and causing the ring 44 to be deformed to an extent dependent on the axial play of the gear. This leaves the bearing 16—18 pressed into the gear as indicated by Fig. 1.

Thus as the bearing is pushed into gear, the ring 44 bottoms against recess 45 as indicated in Fig. 2. Continued movement of the bearing deflects the ring as indicated in Figs. 1 and 3 until the pin 39 engages the gaging plug 29. This completed operation will produce an assembly where the outer surface of race 18 is always at precise distance from the pitch diameter of face gear 14. Should a different distance be required between race 18 and the pitch diameter of 14 the gaging plug 29 must be moved accordingly.

The establishment of this relation is not dependent on any particular assembly fixture but may be accomplished manually or otherwise. In the assembly gears such as the gear 14, however, the illustrated fixture greatly facilitates the assembly process for the reason that it quickly puts the races 16 and 18 into the desired relation, the desired positioning of the race 16 being assured by the restraining effect of the ring 44.

I claim.

1. The combination of first and second gears arranged to mesh with one another and to rotate about first and second shafts respectively, said second gear having a surface angularly disposed with respect to the diametrical dimension of said first gear, inner and outer roller bearings supporting said second gear on said second shaft, means positioning the inner races of said inner and outer bearings on said second shaft and means extending between said second gear and the outer race of said inner bearing whereby the pitch diameter of said second gear is maintained in constant rolling contact with said first gear.

2. The combination of first and second gears arranged to mesh with one another and to rotate about first and second shafts respectively, said second gear having a surface angularly disposed with respect to diametrical dimension of said first gear, first and second roller bearings supporting said second gear on said second shaft, means maintaining the inner races of said bearings against movement away from one another and in a position such that an edge of the inner race of said first bearing is in plane spaced from that of said angularly disposed surface, and means extending between said surface and the outer race of said first bearing for biasing the outer races of said bearings to positions such that said gears are maintained in constant rolling contact with one another.

3. A differential mechanism according to claim 1 wherein the means extending between said second gear and the outer race of said inner bearing is a flat ring.

References Cited in the file of this patent

UNITED STATES PATENTS

| | | |
|---|---|---|
| 1,645,521 | Collins | Oct. 18, 1927 |
| 1,693,538 | Allen | Nov. 27, 1928 |
| 2,083,413 | Weist | June 8, 1937 |
| 2,277,369 | Schultz et al. | Mar. 24, 1942 |
| 2,336,262 | Krasberg | Dec. 7, 1943 |
| 2,663,198 | Cairnes | Dec. 22, 1953 |
| 2,717,522 | Mottu | Sept. 13, 1955 |
| 2,859,033 | Rose | Nov. 4, 1958 |